United States Patent
Tsai et al.

(10) Patent No.: US 11,507,774 B2
(45) Date of Patent: Nov. 22, 2022

(54) DEVICE AND METHOD FOR SELECTING A DEEP LEARNING NETWORK FOR PROCESSING IMAGES

(71) Applicant: HON HAI PRECISION INDUSTRY CO., LTD., New Taipei (TW)

(72) Inventors: Tung-Tso Tsai, New Taipei (TW); Chin-Pin Kuo, New Taipei (TW); Guo-Chin Sun, New Taipei (TW); Tzu-Chen Lin, New Taipei (TW); Wan-Jhen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 85 days.

(21) Appl. No.: 17/226,388

(22) Filed: Apr. 9, 2021

(65) Prior Publication Data

US 2021/0326641 A1    Oct. 21, 2021

(30) Foreign Application Priority Data

Apr. 17, 2020    (CN) .......................... 202010306845.9

(51) Int. Cl.
*G06K 9/62* (2022.01)
*G06N 3/08* (2006.01)
*G06N 3/04* (2006.01)

(52) U.S. Cl.
CPC .......... *G06K 9/6227* (2013.01); *G06K 9/6215* (2013.01); *G06K 9/6257* (2013.01); *G06K 9/6262* (2013.01); *G06N 3/0454* (2013.01); *G06N 3/08* (2013.01)

(58) Field of Classification Search
CPC .. G06K 9/6227; G06K 9/6215; G06K 9/6257; G06K 9/6262; G06K 9/6268; G06N 3/0454; G06N 3/08; G06V 10/761; G06V 10/764; G06V 10/7747; G06V 10/776; G06V 10/87
USPC ....................................................... 382/157
See application file for complete search history.

(56) References Cited

U.S. PATENT DOCUMENTS

| | | | |
|---|---|---|---|
| 2019/0251398 A1* | 8/2019 | Godwin, IV | G06V 20/188 |
| 2020/0005135 A1* | 1/2020 | Che | G06N 3/063 |
| 2020/0104701 A1* | 4/2020 | Lee | G06N 5/04 |

(Continued)

FOREIGN PATENT DOCUMENTS

| | | |
|---|---|---|
| TW | 201909112 | 3/2019 |
| WO | 2019048506 | 3/2019 |

*Primary Examiner* — Juan A Torres
(74) *Attorney, Agent, or Firm* — ScienBiziP, P.C.

(57) ABSTRACT

A method for selecting a deep learning network which is optimal for solving an image processing task obtaining a type of the image processing task, selecting a data set according to the type of problem, and dividing selected data set into training data and test data. Similarities between different training data are calculated, and a batch size of the training data is adjusted according to the similarities of the training data. A plurality of deep learning networks is selected according to the type of problem, and the plurality of deep learning networks is trained through the training data to obtain network models. Each of the network models is tested through the test data, and the optimal deep learning network with the best test result is selected from the plurality of deep learning networks appropriate for image processing.

14 Claims, 3 Drawing Sheets

(56) References Cited

U.S. PATENT DOCUMENTS

2020/0202167 A1\* 6/2020 Gross ..................... G06N 3/08
2021/0201110 A1\* 7/2021 Qin ........................ G06N 3/04

\* cited by examiner

DEVICE AND METHOD FOR SELECTING A DEEP LEARNING NETWORK FOR PROCESSING IMAGES

FIELD

The subject matter herein generally relates to image processing.

BACKGROUND

Convolutional neural network (CNN) is widely used as a tool in a computer vision. When a developer needs to select a suitable CNN algorithm from multiple CNN algorithms to build an image processing model, the developer should have a rich development experience and a deep professional background, or should be doing a large number of analysis experiments. It is difficult for an ordinary person to select the most suitable CNN algorithm.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
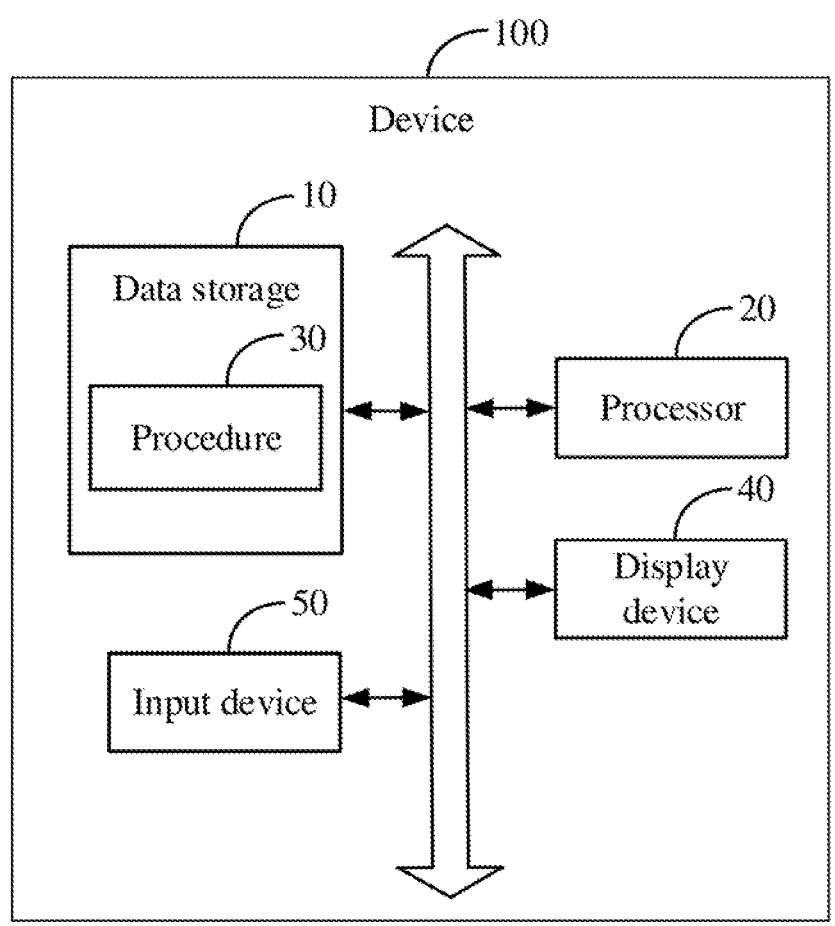
FIG. 1 is a block diagram of an embodiment of a device for selecting a deep learning network.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a device 100 for selecting a deep learning network out of a number of candidates in accordance with an embodiment. The device 100 can reduce a difficulty of choosing deep learning algorithms to solve a specific problem.

Deep learning (DL) is a very active research field of machine learning. Convolutional neural networks (CNN) and recurrent neural networks (RNN) are the representative algorithms of the DL.

The device 100 can comprise at least one data storage 10, at least one processor 20, a procedure for selecting the deep learning network (procedure 30), a display device 40, and an input device 50. The procedure 30 may comprise a plurality of computerized codes, the plurality of computerized codes may include commands that can be executed by the processor 20. The procedure 30 can be stored in the data storage 10.

In one embodiment, the device 100 can be a computer or a server. The device 100 can further comprise a network access device and communication buses.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for the temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

In one embodiment, the display device 40 can display a result of training data or test data. For example, a result of a tested deep learning algorithm model is displayed by the display device 40. The display device 40 can be a touch screen, a liquid crystal display, etc. The input device 50 is configured to input various information or control instructions, such as confirming a type of problem to be solved by the deep learning network. The input device can be a remote control, a mouse, a voice input device, a touch screen, etc.

Figure 2:
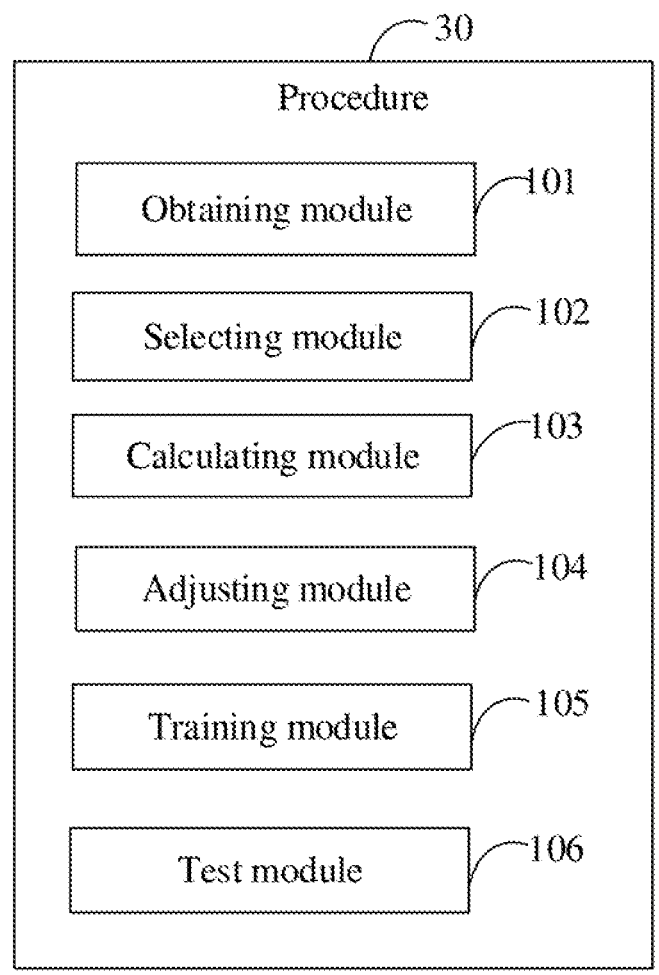
FIG. 2 is a block diagram of an embodiment of a procedure for selecting a deep learning network of the device of FIG. 1.

FIG. 2 illustrates the procedure 30 as comprising a plurality of modules, such as an obtaining module 101, a selecting module 102, a calculating module 103, an adjusting module 104, a training module 105, and a test module 106. The modules 101-106 may comprise one or more software programs in the form of computerized codes stored in the data storage 10. The computerized codes may include commands that can be executed by the processor 20 to provide functions for the modules 101-106.

The obtaining module 101 is configured to obtain a type of problem that the deep learning network is required to solve.

For example, the type of problem can be in the field of image processing. The type of image processing problem comprises an image classification, object segmentation, and object recognition. The type of problem can also refer to other data analysis in addition to pure image data.

The selecting module 102 is configured to select a data set according to the type of problem and divide the selected data set into the training data and the test data.

In one embodiment, the selecting module 102 is further configured to select a plurality of deep learning networks according to the type of problem.

The calculating module 103 is configured to calculate a similarity of the training data.

In one embodiment, the calculating module 103 can calculate the similarity of the training data through a structural similarity index measure (SSIM) algorithm. An SSIM is an index for measuring a similarity of two images. The SSIM algorithm can measures the similarity of the two images through three aspects: luminance, contrast, and structure. A range of a value of the SSIM of the two images is 0 to 1. The greater the value of the SSIM, the greater the similarities between the two images. If the two images are the same image, the value of the SSIM of each of the two images is equal to 1.

For example, the training data comprises one hundred images, forty images are randomly selected from the training data to form twenty sample groups. Each of the twenty sample groups comprises two images. The calculating module 103 calculates a sample similarity between the two images of each of the twenty sample groups respectively and further calculates an average similarity of the twenty sample groups according to the sample similarity of each of the twenty sample groups. The average similarity of the twenty sample groups is defined as the similarity of the training data.

In one embodiment, the number of sample groups selected from the training data can be determined according to a data size of the training data. The calculating module 103 calculates the similarity of the training data according to the average similarity of the selected sample groups.

In one embodiment, the calculating module 103 can select other algorithms to calculate the similarity of the training data, such as a shape context algorithm.

The adjusting module 104 is configured to adjust a batch size of the training data according to the similarity of the training data.

The training module 105 is configured to train the plurality of deep learning networks through the training data to obtain network models.

The test module 106 is configured to test each of the network models through the test data. The selecting module 102 is further configured to select an optimal deep learning network with the best result from the plurality of deep learning networks corresponding to the type of problem.

In one embodiment, the device 100 can use the similarity of the training data to adjust the batch size of training data to improve a training quality of the training data. The device 100 further uses the test data to verify algorithm models and selects the best deep learning network to solve a specific problem. Thereby, the difficulty of selecting a suitable deep learning network for the specific problem is reduced.

Figure 3:
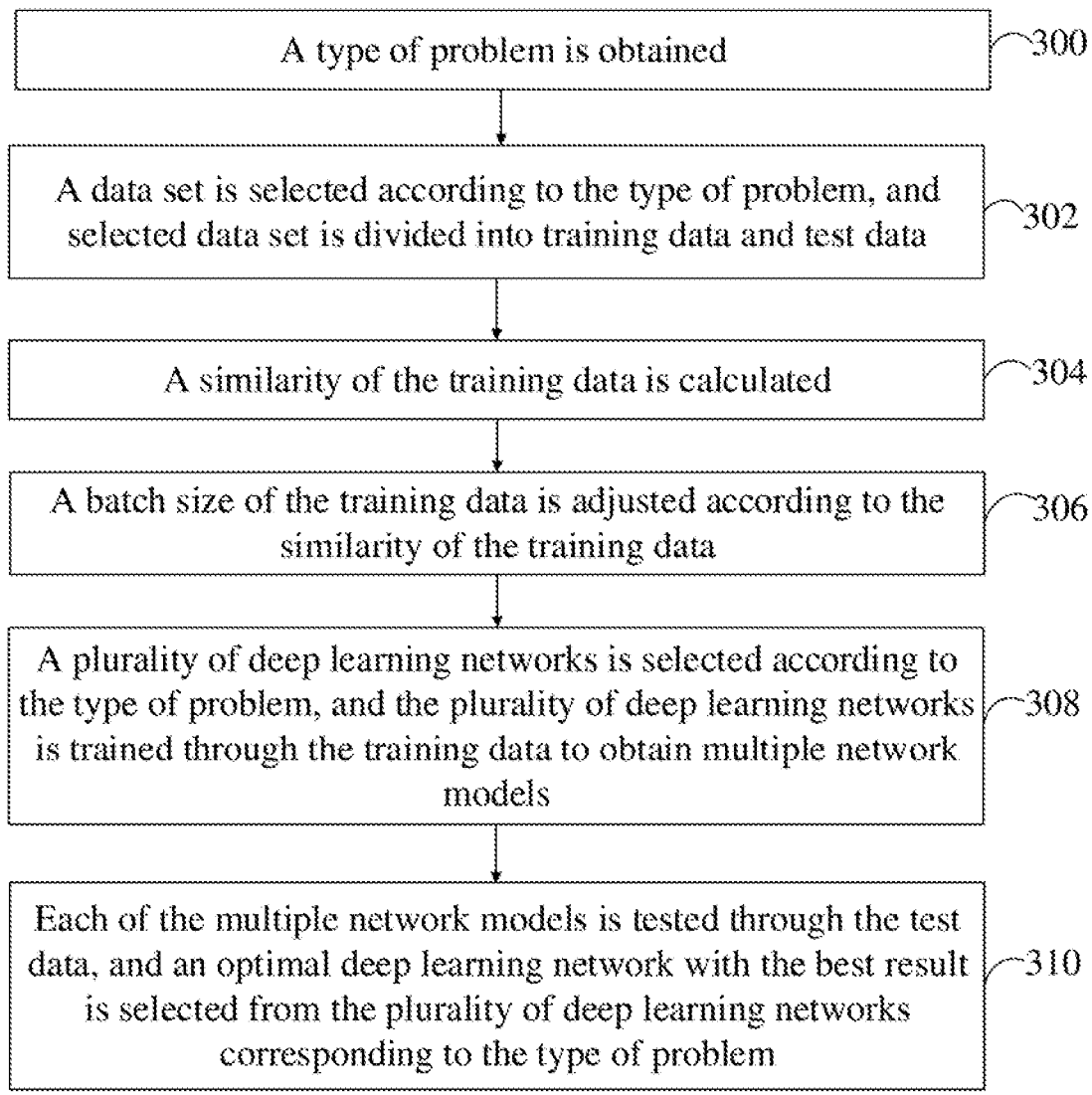
FIG. 3 is a flow diagram of an embodiment of a method for selecting a deep learning network utilized in the device of FIG. 1.

FIG. 3 illustrates one exemplary embodiment of a method for selecting a deep learning network. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, a type of problem is obtained.

In one embodiment, the type of problem is obtained by the obtaining module 101. For example, the type of problem refers to an image processing project. Such type of image processing project can comprise an image classification, object segmentation, and object recognition. The type of problem can also refer to the analysis of other data in addition to pure image data.

In block 302, a data set is selected according to the type of problem, and selected data set is divided into training data and test data.

In one embodiment, the selecting module 102 can select the data set according to the type of problem and divide the selected data set into training data and test data.

For example, a common object in context (COCO) is an image data set. The COCO comprises more than three hundred thousand images, more than two million instances, and more than eighty types of objects, etc.

The training data is configured to train the plurality of deep learning networks to obtain a plurality of network models and the test data is configured to verify an accuracy of each of the plurality of network models.

A ratio of the training data to the test data can be four to one. The ratio of the training data to the test data can be adjusted according to an actual application. For example, the ratio of the training data to the test data is five to one or three to one.

In block 304, a similarity of the training data is calculated.

In one embodiment, the similarity between sets of training data is calculated by the calculating module 103. The calculating module 103 can calculate the similarity of the training data through an SSIM algorithm. A range of values of the SSIM of the two images is from 0 to 1. The greater the value of the SSIM, the greater is the similarity between the two images. If the two images are the same image, the value of the SSIM of the two images is equal to 1.

In one embodiment, the similarity of the training data can be a similarity between sets of the training data. Multiple sample groups can be selected from the training data. Each of the multiple sample groups comprises two images. The calculating module 103 calculates a sample similarity between the two images of each of the multiple sample groups and further calculates an average similarity of the multiple sample groups according to the sample similarity of each of the multiple sample groups. The average similarity of the multiple sample groups is defined as the similarity of the training data.

In block 306, a batch size of the training data is adjusted according to the similarity of the training data.

In one embodiment, the adjusting module 104 can adjust the batch size of the training data according to the similarity of the training data. Then, the adjusted training data can be configured to accurately train weightings of the deep learning network.

In one embodiment, the similarity of the training data is equal to the value of the SSIM of the training data. Relationships between the similarity of the training data and the batch size of the training data are shown in table 1. The batch size is defined as the number of training data input into a model for training each time.

TABLE 1

| The range of the SSIM | Batch size of the training data |
| --- | --- |
| $0 \leq SSIM < 0.2$ | 64 |
| $0.2 \leq SSIM < 0.4$ | 32 |
| $0.4 \leq SSIM < 0.6$ | 16 |
| $0.6 \leq SSIM < 0.8$ | 8 |
| $0.8 \leq SSIM \leq 1$ | 4 |

In one embodiment, the batch size of the training data is inversely proportional to the similarity of the training data. In Table 1, the greater the value of the SSIM, the smaller is the batch size.

In one embodiment, the batch size of the training data can be a range value, as shown in Table 2.

TABLE 2

| The range of the SSIM | Batch size of the training data |
|---|---|
| 0 ≤ SSIM < 0.2 | 33~64 |
| 0.2 ≤ SSIM < 0.4 | 17~32 |
| 0.4 ≤ SSIM < 0.6 | 9~16 |
| 0.6 ≤ SSIM < 0.8 | 5~8 |
| 0.8 ≤ SSIM ≤ 1 | 1~4 |

In one embodiment, the batch size of the training data can be adjusted according to the similarity of the training data and the actual application, adjustment not being limited to values of Table 1 and Table 2.

In block 308, a plurality of deep learning networks is selected according to the type of problem, and the plurality of deep learning networks is trained through the training data to obtain multiple network models.

In one embodiment, the selecting module can select the plurality of deep learning networks according to the type of problem. The training module 105 can train the plurality of deep learning networks through the training data to obtain the network models. The plurality of deep learning networks is convolutional neural networks (CNNs).

In one embodiment, the plurality of deep learning networks for processing images can comprise a residual network (ResNet), an Alex network (AlexNet), a visual geometry group network (VGGNet), an inception network, a Google inception network (GoogLeNet), etc.

In block 310, each of the multiple network models is tested through the test data, and an optimal deep learning network with the best result is selected from the plurality of deep learning networks corresponding to the type of problem.

In one embodiment, the test module 106 can test each of the network models through the test data. The selecting module can further select the optimal deep learning network with the best result from the plurality of deep learning networks corresponding to the type of problem.

In one embodiment, a similarity of the test data can also be calculated by the calculating module 103. The adjusting module 104 can further adjust a batch size of the test data according to the similarity of the test data.

The embodiments shown and described above are only examples. Many details known in the relevant field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for selecting a deep learning network comprising:

obtaining a type of problem of an image processing;

selecting a data set according to the type of problem and dividing selected data set into training data and test data;

calculating a similarity of the training data;

adjusting a batch size of the training data according to the similarity of the training data;

selecting a plurality of deep learning networks according to the type of problem, and training the plurality of deep learning networks through the training data to obtain multiple network models; and testing each of the multiple network models through the test data and selecting an optimal deep learning network with the best test result from the plurality of deep learning networks corresponding to the image processing.

2. The method of claim 1, wherein calculating the similarity of the training data comprises:

selecting multiple sample groups from the training data, wherein each sample group comprises two samples;

calculate a sample similarity between the two samples of each of the multiple sample groups;

calculating an average similarity of the multiple sample groups according to the sample similarity of each of the multiple sample groups; and defining the average similarity as the similarity of the training data.

3. The method of claim 2, wherein the multiple sample groups are randomly selected from the training data.

4. The method of claim 1, wherein the batch size of the training data is inversely proportional to the similarity of the training data.

5. The method of claim 1, wherein the type of problem of the image processing comprises an image classification, an object segmentation, and an object recognition.

6. The method of claim 1, wherein the plurality of deep learning networks comprises a residual network (ResNet), an Alex network (AlexNet), a visual geometry group network (VGGNet), and an inception network.

7. The method of claim 1, wherein calculating the similarity of the training data comprises:

calculating the similarity of the training data through a structural similarity index measure (SSIM) algorithm.

8. A device for selecting a deep learning network comprising:

a storage device; and at least one processor;

wherein the storage device stores one or more programs, which when executed by the at least one processor, causing the at least one processor to:

obtain a type of problem of an image processing;

select a data set according to the type of problem and divide selected data set into training data and test data;

calculate a similarity of the training data;

adjust a batch size of the training data according to the similarity of the training data;

select a plurality of deep learning networks according to the type of problem, and train the plurality of deep learning networks through the training data to obtain multiple network models; and test each of the multiple network models through the test data and select an optimal deep learning network with the best test result from the plurality of deep learning networks corresponding to the image processing.

9. The device of claim 8, wherein the at least one processor calculating the similarity of the training data comprises:
- selecting multiple sample groups from the training data, wherein each sample group comprises two samples;
- calculate a sample similarity between the two samples of each of the multiple sample groups;
- calculating an average similarity of the multiple sample groups according to the sample similarity of each of the multiple sample groups; and
- defining the average similarity as the similarity of the training data.

10. The device of claim 9, wherein the multiple sample groups are randomly selected from the training data.

11. The device of claim 8, wherein the batch size of the training data is inversely proportional to the similarity of the training data.

12. The device of claim 8, wherein the type of problem of the image processing comprises an image classification, an object segmentation, and an object recognition.

13. The device of claim 8, wherein the plurality of deep learning networks comprises a ResNet, an AlexNet, a VGG-Net, and an inception network.

14. The device of claim 8, wherein the at least one processor calculating the similarity of the training data comprises:
- calculating the similarity of the training data through an SSIM algorithm.

* * * * *